United States Patent
Loyer et al.

(10) Patent No.: US 6,687,293 B1
(45) Date of Patent: Feb. 3, 2004

(54) METHOD, SYSTEM AND APPARATUS FOR CALIBRATING A PULSE POSITION MODULATION (PPM) DECODER TO A PPM SIGNAL

(75) Inventors: Stephen R. Loyer, Gilbert, AZ (US); Samuel Alexander, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 715 days.

(21) Appl. No.: 09/602,291

(22) Filed: Jun. 23, 2000

(51) Int. Cl.$^7$ .......................... H03K 7/04; H04L 27/06; G08C 19/00
(52) U.S. Cl. .................. 375/239; 375/316; 340/10.3; 340/825.65
(58) Field of Search ................... 375/239, 316, 375/340; 370/205, 213; 329/313; 340/825.57–825.67, 10.1–10.3

(56) References Cited

U.S. PATENT DOCUMENTS

| 3,575,665 A | 4/1971 | Honma | 329/107 |
| RE31,254 E | 5/1983 | Brodeur | 343/103 |
| 4,384,288 A | 5/1983 | Walton | 340/825.34 |
| 4,555,702 A * | 11/1985 | Matsuura et al. | 340/825.64 |
| 4,648,133 A | 3/1987 | Vilnrotter | 455/608 |
| 4,742,470 A * | 5/1988 | Juengel | 700/175 |
| 5,354,319 A | 10/1994 | Wyborny et al. | 607/32 |
| 6,434,194 B1 * | 8/2002 | Eisenberg et al. | 375/238 |

FOREIGN PATENT DOCUMENTS

| DE | 004003410 A1 * | 8/1991 | G01S/13/80 |
| WO | WO 02/05504 * | 1/2002 | H04L/25/49 |

OTHER PUBLICATIONS

International Search Report for PCT/US01/19599, 6 pages, Dec. 27, 2001.

* cited by examiner

Primary Examiner—Tesfaldet Bocure
(74) Attorney, Agent, or Firm—Baker Botts L.L.P.

(57) ABSTRACT

A radio frequency identification (RFID) tag device having a pulse position modulation (PPM) decoder circuit which calculates a relative frequency relationship between an internal oscillator of the RFID tag device and an external PPM source such as a RFID tag reader. The PPM decoder circuit is calibrated to the difference between the external PPM frequency source (i.e., RFID tag reader) and the internal clock-oscillator of the RFID tag device, which is performed in a single measurement during one calibration symbol period.

11 Claims, 8 Drawing Sheets

*FIG. 10*

|  | | LOWER 3 BITS OF CALIBRATION CODE | | | | | | | |
|---|---|---|---|---|---|---|---|---|---|
|  | | 0 | 1 | 2 | 3 | 4 | 5 | 6 | 7 |
| BIT WINDOW COUNTER | 0 | F | F | F | T | F | F | T | T |
|  | 1 | F | F | F | T | T | F | T | T |
|  | 2 | F | F | F | T | F | F | T | T |
|  | 3 | F | F | T | F | T | T | F | T |
|  | 4 | F | F | F | F | T | T | T | T |
|  | 5 | F | F | F | F | T | T | T | T |
|  | 6 | F | F | F | F | F | T | T | T |
|  | 7 | F | T | T | F | T | T | F | F |
|  | 8 | F | F | F | T | F | F | T | T |
|  | 9 | F | F | F | T | T | F | T | T |
|  | 10 | F | F | F | T | F | T | T | T |
|  | 11 | F | F | T | F | T | T | F | T |
|  | 12 | F | F | F | F | F | T | T | T |
|  | 13 | F | F | F | F | T | T | T | T |
|  | 14 | F | F | F | F | T | T | T | T |
|  | 15 | F | T | T | F | T | T | F | F |

*FIG. 11*

| | | CURRENT CALIBRATION CODE VALUE (LEAST SIGNIFICANT 2 BITS) | | | | | | | |
|---|---|---|---|---|---|---|---|---|---|
| | | $xxxx00_2$ | | $xxxx01_2$ | | $xxxx10_2$ | | $xxxx11_2$ | |
| | | $BWC_{16}$ | $BDC_{16}$ | $BWC_{16}$ | $BDC_{16}$ | $BWC_{16}$ | $BDC_{16}$ | $BWC_{16}$ | $BDC_{16}$ |
| CURRENT CALIBRATION CODE VALUE (MOST SIGNIFICANT 4 BITS) | $0100xx_2$ | E | 6 | E | 7 | E | 8 | E | 9 |
| | $0101xx_2$ | E | A | E | B | D | 0 | D | 1 |
| | $0110xx_2$ | D | 2 | D | 3 | D | 4 | D | 5 |
| | $0111xx_2$ | D | 6 | D | 6 | D | 7 | D | 8 |
| | $1000xx_2$ | D | 9 | D | A | D | B | D | C |
| | $1001xx_2$ | D | D | D | D | C | 0 | C | 1 |
| | $1010xx_2$ | C | 2 | C | 3 | C | 4 | C | 5 |
| | $1011xx_2$ | C | 5 | C | 5 | C | 6 | C | 7 |

METHOD, SYSTEM AND APPARATUS FOR CALIBRATING A PULSE POSITION MODULATION (PPM) DECODER TO A PPM SIGNAL

FIELD OF THE INVENTION

This invention relates generally to radio frequency identification (RFID) tag devices, and more particularly, to a radio frequency identification tag device which calibrates its decoder timing from a received pulse position modulation (PPM) signal within one calibration symbol time.

BACKGROUND OF THE RELATED TECHNOLOGY

Radio frequency identification (RFID) tag devices may be used in managing inventory, automatic identification of cars on toll roads, security systems, electronic access cards, keyless entry and the like. RFID tag devices will work under more hostile environmental conditions than bar code labels since the RFID tag device may be read through paint, water, dirt, dust, human bodies, concrete, or through the tagged item itself. RFID tag devices are used in conjunction with a radio frequency tag reader (interrogator) which generates a continuous wave (CW) radio frequency (RF) or electromagnetic carrier that activates the RFID tag device at close range. The RFID tag device is passive and may have no internal power sources, rather it uses some of the power in the CW RF or electromagnetic carrier of the RFID tag reader to power internal circuits that read a stored internal digital code and cause the RFID tag device to signal its stored internal digital code to the RFID tag reader.

The RFID tag device modifies the amplitude of the CW carrier of the RFID tag reader by tuning and detuning a resonant circuit tuned to the CW carrier. The RFID tag device comprises, for example, a parallel resonant circuit or antenna tuned to the frequency of the CW radio frequency or electromagnetic carrier, an RF to direct current (DC) converter, a circuit for tuning and detuning the parallel resonant circuit/antenna, logic which stores the internal digital code, logic which reads the internal digital code and causes the circuit for tuning and detuning the parallel resonant circuit/antenna to operate in co-operation with the internally stored digital code.

An excellent application for RFID tag devices is item level tagging such as retail and inventory management where a large number of RFID tags may be read and written in the same reader field. Read-write memory is incorporated in the RFID tag device and may be allocated for device operation (program) and user data such as for example, but not limited to, inventory number, product expiration date, weight, product description, etc. The RFID tag device may have, for example, two operational modes: 1) "tag talks first" and 2) "reader talks first" modes. The "tag talks first" mode is when the RFID tag device transmits its data as soon as it is energized by the RFID tag reader. The "reader talks first" mode is when the RFID tag device does not transmit unless being commanded to do so by the RFID tag reader.

The RFID tag reader sends command signals to the RFID tag device by modulating its RF or electromagnetic carrier signal. These command signals may be represented by appropriately timed gap pulses using, for example, Pulse Position Modulation (PPM) of the RF or electromagnetic carrier signal. PPM is a digital transmission scheme whereby data is represented by the temporal location of a pulse or pulses within a time window known as a symbol frame.

It is desirable for power and space considerations of the RFID tag device to utilize an onboard oscillator for supplying the clock timing required for decoding the PPM transmission symbols. The frequency of the internal oscillator of the RFID tag device, however, may vary as much as plus or minus 25 percent because of changes in the semiconductor fabrication process, operating voltage and/or temperature. This much variation in the RFID tag device's internal oscillator clock frequency would make accurate decoding of the PPM transmission impossible if left uncorrected.

Known methods of matching the RFID tag device internal clock oscillator frequency to the external PPM frequency involves adjusting the internal clock oscillator frequency and requires several cycles of calibration symbols to accurately lock the internal clock oscillator to the PPM frequency transmitted by the RFID tag reader. A phase locked loop has been used to adjust the internal clock oscillator frequency in this manner. U.S. Pat. Nos. 4,648,133 and 5,354,319 disclose phase locked loops for controlling the frequency of the PPM decoder clock oscillator so as to lock to the external PPM signal. U.S. Pat. No. RE. 31,254 discloses calculating an error component between a local oscillator and an external frequency source with a software program algorithm running on a microprocessor.

Therefore, what is needed is a simpler, faster and more effective way of calculating the relative frequency relationship between a PPM receiver/decoder oscillator and an externally transmitted PPM signal, and then calibrating the PPM decoder circuit to the required timing precision for correct PPM decoding within one calibration symbol time.

SUMMARY OF THE INVENTION

The invention overcomes the above-identified problems as well as other shortcomings and deficiencies of existing technologies by providing in an RFID tag device a circuit that calculates the relative frequency relationship between an internal oscillator of the RFID tag device and an external PPM source such as a RFID tag reader, and then calibrates the RFID tag device PPM decoder circuit to the required precision for reliable PPM symbol decoding. In the embodiment of the present invention, the PPM decoder is calibrated to the difference between the external PPM frequency source (i.e., RFID tag reader) and the internal clock-oscillator of the RFID tag device, which is preformed in a single measurement during one calibration symbol time.

The RFID tag reader sends the command and acknowledgement signals to the RFID tag device by modulating the continuous wave (CW) carrier signal. The RFID tag reader uses, for example, two classes of encoding signals for modulation. They are (a) 1-of-16 PPM for data transmission, and (b) fast read commands that consist of gap pulse sequences. The gap pulse sequences are controlled by pulse width and time spacing between pulses to encode the command and operating parameters. The RFID tag reader also sends time reference pulses to calibrate the time base of the decoder in the RFID tag device.

The RFID tag reader uses 1 of 16 PPM for control commands such as tag acknowledgement, read a tag block, write a tag block, etc. The 1 of 16 PPM uses the pulse positions in one of sixteen possible time slots as the communication mechanism for sending 4 bit symbols ($2^4$=16). All communications begin with a code violating calibration sequence composed of, for example but not limited to, three pulses in pulse positions zero, six and fourteen.

The symbol frame start and end are not explicitly transmitted and are recovered by knowledge of the last symbol received, the count to the next received pulse and counts per pulse width. An equation describing this relationship is:

$$(\text{sym})_n = \text{CBP}/\text{CPP} - 16 + (\text{sym})_{n-1}$$

where CBP=number of internal oscillator counts between pulses

CPP=number of internal oscillator counts per pulse width $(\text{sym})_{n-1}$=previous received symbol $(\text{sym})_n$=new symbol received Initiating synchronization is achieved by recognizing the code violating calibration symbol and determining the "counts per pulse width" (CPP) of the internal oscillator of the RFID tag device. Maintaining synchronization requires the ability to use the new pulse to correct for any accumulated error between the RFID tag device and the transmitted PPM time bases, and to maintain the time base of the RFID tag device time base to sufficient accuracy between the PPM pulses. For a maximum pulse separation of 31 pulse positions, the maximum allowed error is preferably ½ pulse position. This allows a maximum error of one part in 62, or +/−1.6%.

Timing for detecting (demodulating) these commands from the PPM radio frequency (RF) or electromagnetic transmission is generated by a clock-oscillator internal to the RFID tag device. Communication between the RFID tag reader and RFID tag device takes place asynchronously with respect to the internal oscillator of the RFID tag device. To enhance the detection accuracy in the RFID tag device, the RFID tag reader sends three specifically timed reference pulses followed by the command and programming data signals. The RFID tag device uses the calibration timing pulses to calibrate its timing reference in the PPM decoder. The RFID tag reader transmits the timing pulses at the start of the command. Time periods between the timing pulses may be used to calibrate the RFID tag device's timing for proper PPM decoding. According to the present invention, the RFID tag device measures the time periods between the demodulated time reference pulses, and uses these time periods to calibrate its internal PPM decoder circuit and thus determine the CPP.

The PPM decoder of the RFID tag device may be implemented as a state machine. The PPM decoder state machine uses a bit window counter to track the state of the received PPM transmission. On REID tag device power up, its PPM decoder state machine expects the transmission of a code violating calibration symbol. The format of the calibration symbol generally comprises three modulation pulses at time slots zero, six and fourteen of sixteen possible time slots in a code symbol. Other number of modulation pulses and time slots for a calibration symbol may be used and are contemplated herein.

While the PPM decoder is in its initial state, the bit window counter is reset to $0_{16}$ and kept there until the detection of the first modulation pulse. Once the first modulation pulse of the calibration symbol has been received, a bit down counter is loaded with a reload value, for example $5_{16}$, and is allowed to count down at the rate of the internal clock. When the bit down counter underflows, the bit window counter is incremented by one and the bit down counter is reloaded with the contents of a reload register. The value stored in the reload register consists of the upper 3 bits of a calibration code register plus a 1 in the most significant bit to make a 4 bit reload word. The initial value stored in the calibration code register is $20_{16}$. At each underflow of the bit down counter, the bit window counter is incremented by one and the bit down counter is reloaded.

Upon reception of the next modulation pulse, if the bit window counter is in the range of $5_{16}$ and $7_{16}$, the bit window counter is set to $5_{16}$ and the bit down counter is reloaded with $5_{16}$ Operation of the invention proceeds as before with the bit down counter causing the bit window counter to increment on each underflow and the bit down counter being reloaded with the contents of the reload register. During this period the calibration controller will start the calibration counter based on the value stored in the calibration code register, the bit down counter and the bit window counter. The calibration counter counts in the range of $08_{16}$ to $2F_{16}$ and increments at the rate of the internal oscillator. If a third modulation pulse occurs within the bit window range of $C_{16}$ to $F_{16}$ then it is assumed that this is the calibration symbol. The bit window counter is reset to $E_{16}$, the bit down counter is reloaded with $5_{16}$, and the calibration code register is loaded with the current value of the calibration counter (from $08_{16}$ to $2F_{16}$).

PPM symbol reception begins once the bit window counter rolls over to $0_{16}$. PPM uses the bit position within the symbol frame to represent data. The bit window counter is used to decode this symbol value. On every modulation pulse, the bit down counter is loaded with $5_{16}$, which is approximately the midpoint of every window for all allowed values found in the calibration code register. At any time, a calibration symbol may occur as long as it is properly framed within a symbol time. A calibration controller starts the calibration counter based on the current calibration code, bit window counter and bit down counter. If the current calibration code is correct, then the reception of the $3^{rd}$ bit of the calibration symbol will occur when the values in the bit window counter equals $E_{16}$ and the bit down counter equals $5_{16}$, respectively. Under these conditions the value in the calibration counter will always equal the value in the calibration code register. The difference between the old calibration code register value and a new value represents the accumulated error in clock cycles over 8 bits times. For example, if the difference between an old value and the new value of the calibration code register is one then the accumulated calibration error is one count in eight bit periods or ⅛ of a clock per bit period.

This example represents the precision of this embodiment of the present invention. The level of precision that is required is determined by the worst case transmission which is the symbol $0_{16}$ followed by the symbol $F_{16}$. The spacing between a symbol $\mathbf{0}_{16}$ and a symbol $F_{16}$ is 31 bit window spaces. Therefore the worst case accumulated error at the given precision would be plus or minus $3\frac{1}{8}^{ths}$ or approximately 4 for a total window error of less than 8. For a successful transmission to occur the worst case error must be less than the number of counts in the bit window. It is not possible to produce $\frac{1}{8}^{th}$ of a count on every symbol without using an oscillator running at eight times the count frequency. Since this would be undesirable in terms of power consumption, the fractional window values are implemented as an average over the entire symbol time. This is implemented by incrementing the reload register value by one, N out of 8 times, where N is the value in the lower 3 bits of the calibration code register.

An advantage of the present invention is calibrating a PPM decoder to a difference between an internal clock-oscillator and a received PPM frequency.

Another advantage is that a single simple oscillator is used that consumes less power than a frequency matching or locking local oscillator such as a phase-locked-loop.

A feature of the present invention is that a simple low power counter is used to generate a new calibration mode.

The foregoing and other features and advantages of the invention will be apparent from the following, more particular, description of the preferred embodiments of the invention, as illustrated in the accompanying drawings.

BRIEF DESCRIPTION OF THE DRAWINGS

FIG. 10 is a truth table for N of 8 function; and

FIG. 11 is a table of values of the bit window counter and bit down counter for which the calibration start function evaluates true for a given current calibration code.

DETAILED DESCRIPTION OF THE PREFERRED EMBODIMENT

Figure 1:
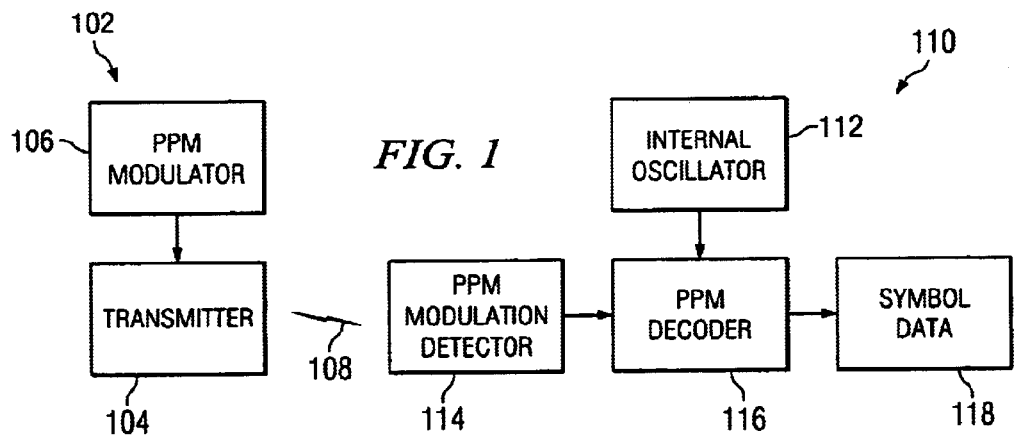
FIG. 1 is a schematic block diagram of an asynchronous pulse position modulation (PPM) RFID tag system.

The present invention is an RFID tag device comprising a circuit that calculates the relative frequency relationship between an internal oscillator of the RFID tag device and an external PPM source such as a RFID tag reader, and then calibrates the RFID tag device PPM decoder circuit to the required precision for reliable PPM symbol decoding. In the embodiment of the present invention, the PPM decoder is calibrated to the difference between the external PPM frequency source (i.e., RFID tag reader) and the internal oscillator of the RFID tag device, which is performed in a single measurement during one code violating calibration symbol period (hereinafter calibration symbol period).

Referring now to the drawings, the details of the preferred embodiment of the invention are schematically illustrated. Elements in the drawings that are the same will be represented by the same numbers and/or letters, and similar elements will be represented by the same numbers and/or letters with a different lower case letter suffix.

Referring to FIG. 1, a schematic block diagram of an RFID tag system is illustrated. A transmitter—PPM modulator portion of an RFID tag reader is indicated generally by the numeral 102 and comprises a transmitter 104 and a PPM modulator 106 for modulating the radio frequency (RF) or electromagnetic transmission 108 from the transmitter 104. A receiver-decoder portion of an RFID tag device is indicated generally by the numeral 110 and comprises a PPM modulation detector 114, an internal oscillator 112, a PPM decoder 116, and symbol data 118. It is contemplated and within the scope of the present invention that the RFID tag device 110 may be fabricated on a single semiconductor integrated circuit die (not illustrated) and produced in a number of different integrated circuit packages (not illustrated).

Figure 1A:
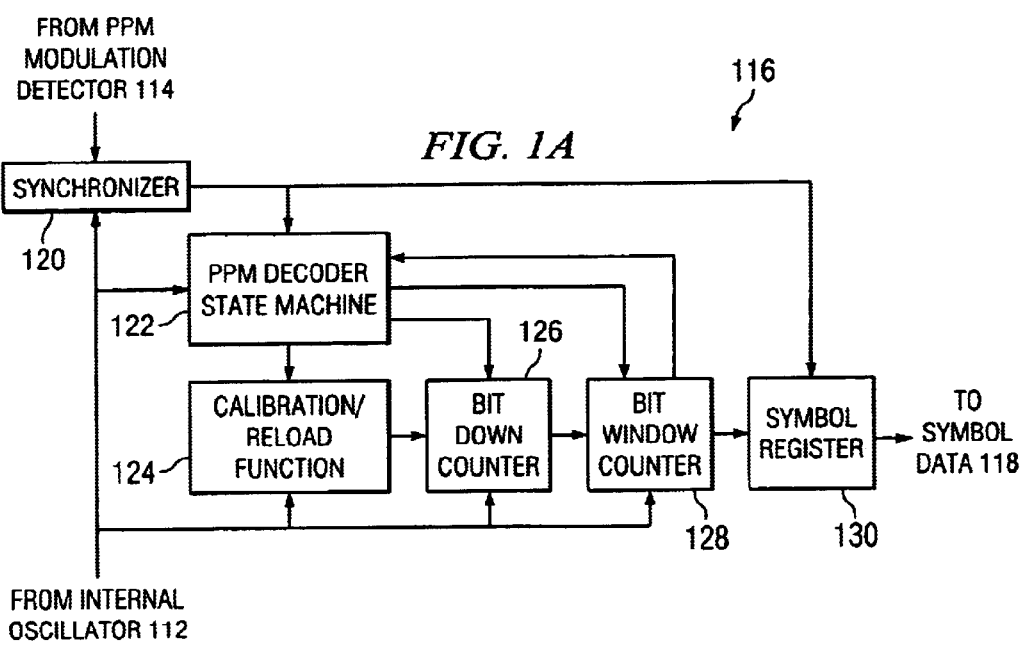
FIG. 1A is a more detailed schematic block diagram of a PPM decoder of the RFID tag system illustrated in FIG. 1.

Operationally, commands, data, etc., (hereinafter information) is transferred to the RFID tag device 110 over the transmission 108 from the transmitter 104 which is modulated by the PPM modulator 106. The information is applied to the PPM modulator 106 along with a clock source (not illustrated) that is part of the RFID tag reader 102. This information is received by the PPM modulation detector 114 of the RFID tag device 110, and is decoded by the PPM decoder 116. The PPM decoder 116 uses the internal oscillator 112 for timing functions in the PPM decoding process to produce the symbol data 118. The timing of the internal oscillator 112 must be calibrated with the PPM pulse timing or frequency detected so as to accurately decode the PPM information in the transmission 108. The PPM decoder 116 may be implemented as a state machine or in other ways known to those skilled in the art of digital logic circuits Referring to FIG. 1A, a more detailed schematic block diagram of the PPM decoder 116 in FIG. 1 is illustrated. The PPM decoder 116 comprises a synchronizer 120, a PPM decoder state machine 122, a calibration/reload function 124, a bit down counter 126, a bit window counter 128, and a symbol register 130. The synchronizer 120 receives the detected PPM signal from the PPM modulation detector 114. The PPM decoder 116 tracks the state of the transmission 108. On power up and during operation of the RFID tag device 110, the PPM decoder 116 expects the transmission of code violating calibration symbols (see FIG. 3). The internal oscillator 112 is used as a clock for the synchronizer 120, the PPM decoder state machine 122, the calibration/reload function 124, the bit down counter 126, and the bit window counter 128. The PPM decoder state machine 122 controls operation of the calibration/reload function 124, the bit down counter 126, and the bit window counter 128. After decoding of the PPM symbol, the symbol data is available at the output of the symbol register 130.

Figure 2:
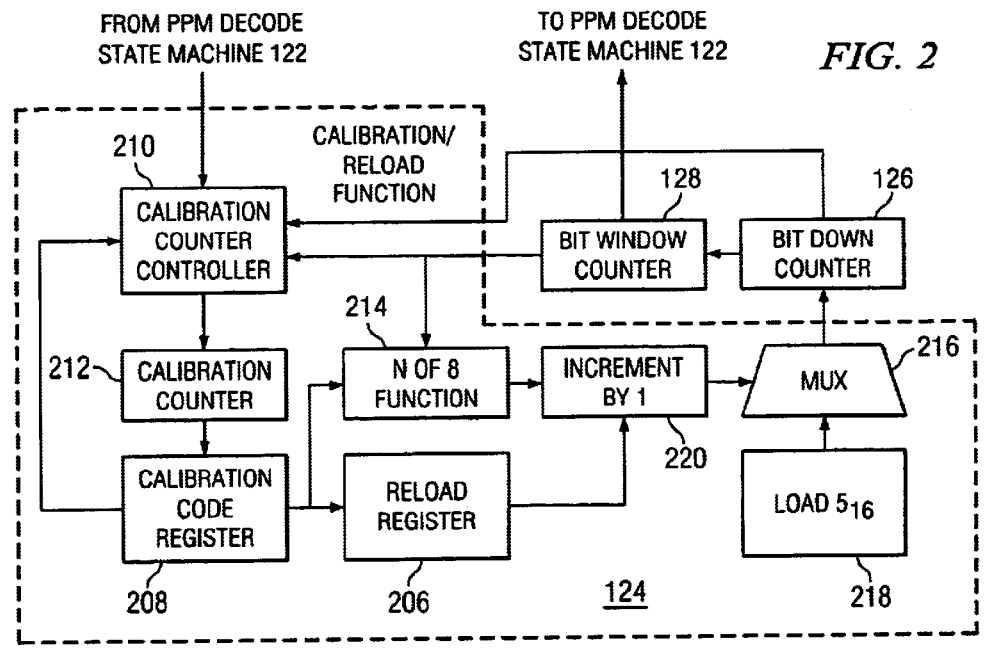
FIG. 2 is a more detailed schematic block diagram of a calibration/reload function of the PPM decoder illustrated in FIG. 1A.

Referring now to FIG. 2, a schematic functional block diagram of the calibration/reload function 124 portion of the PPM decoder 116 is illustrated. The calibration/reload function 124 comprises a calibration counter controller 210, a calibration counter 212, a calibration code register 208, a reload register 206, an N of 8 function 214, an increment by 1 function 220, a load fixed value $5_{16}$ function 218, and a multiplexer 216. The calibration counter controller 210 receives the detected PPM signal from the PPM modulation detector 114.

Figure 3:
FIG. 3 is a schematic timing diagram of a PPM calibration symbol.

Referring to FIG. 3, a schematic timing diagram of the format of the code violating calibration symbol is illustrated. The calibration symbol, generally indicated by the numeral 300, comprises three distinct PPM pulses transmitted within one symbol period. The symbol period comprises 16 time slots, and the three pulses are at time slot position 0 for the first pulse 302, position 6 for the second pulse 304, and position 14 for the third pulse 306. Other number of time slots for a symbol period and number and positions for the calibration pulses may be used and are contemplated herein for the present invention. The time scale in FIG. 3 is for illustration only and other time scales may be utilized depending on the configurations of the invention.

Figure 3A:
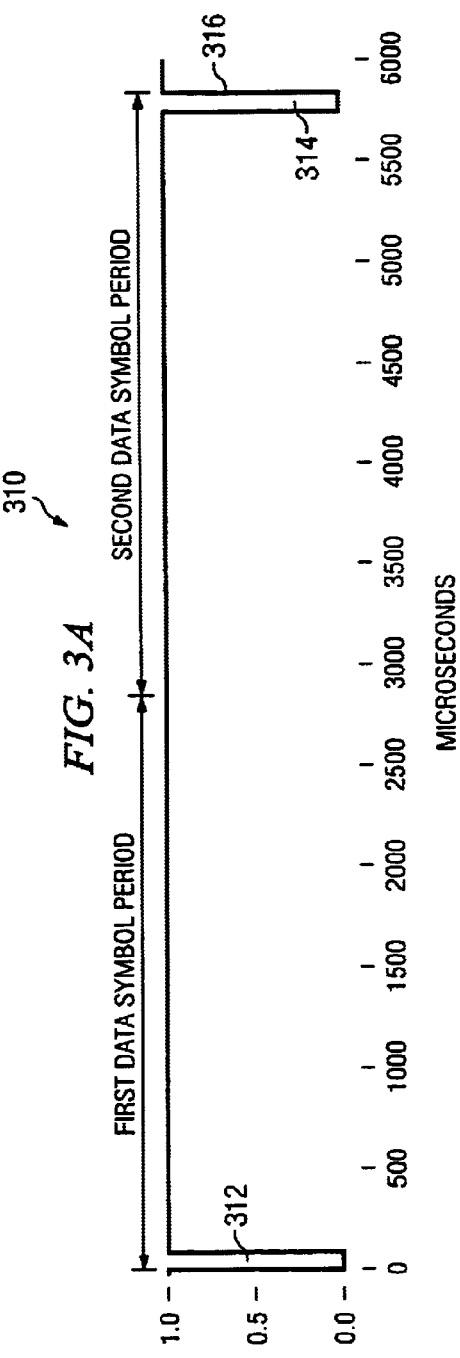
FIG. 3A is a schematic timing diagram of two consecutive data symbols.
Figure 4:
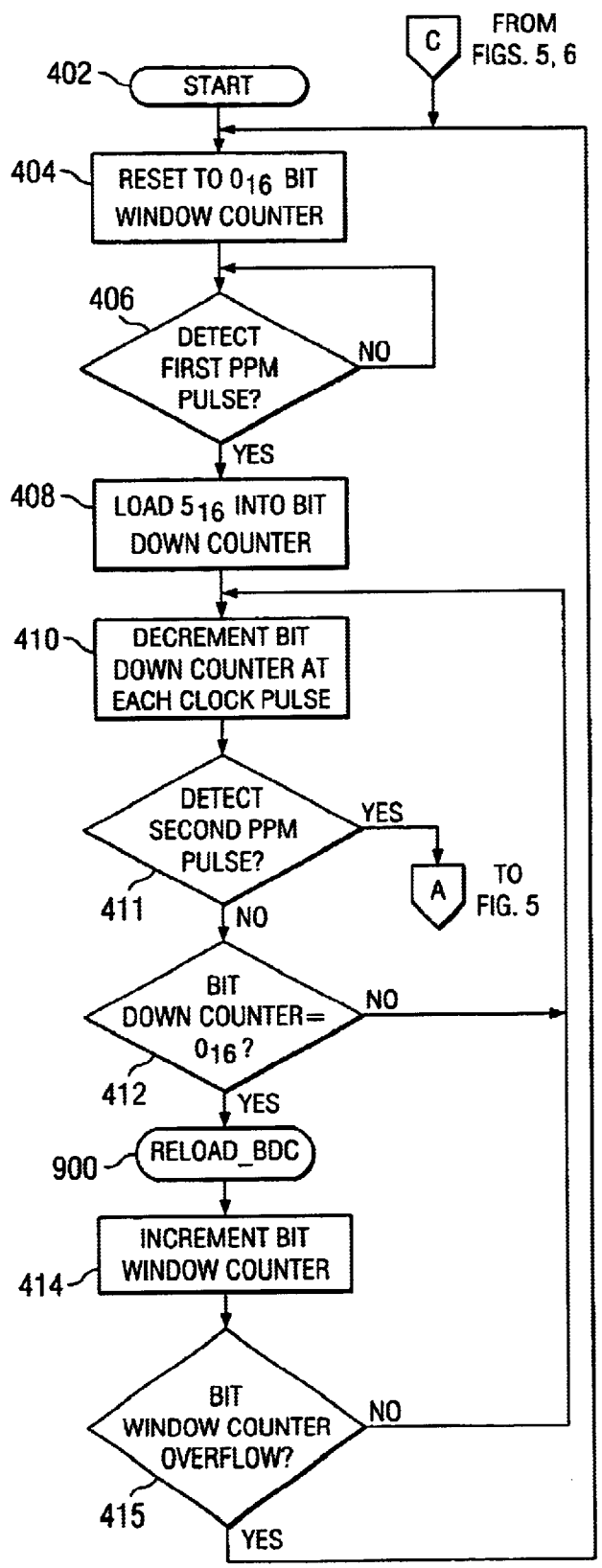
Figure 5:
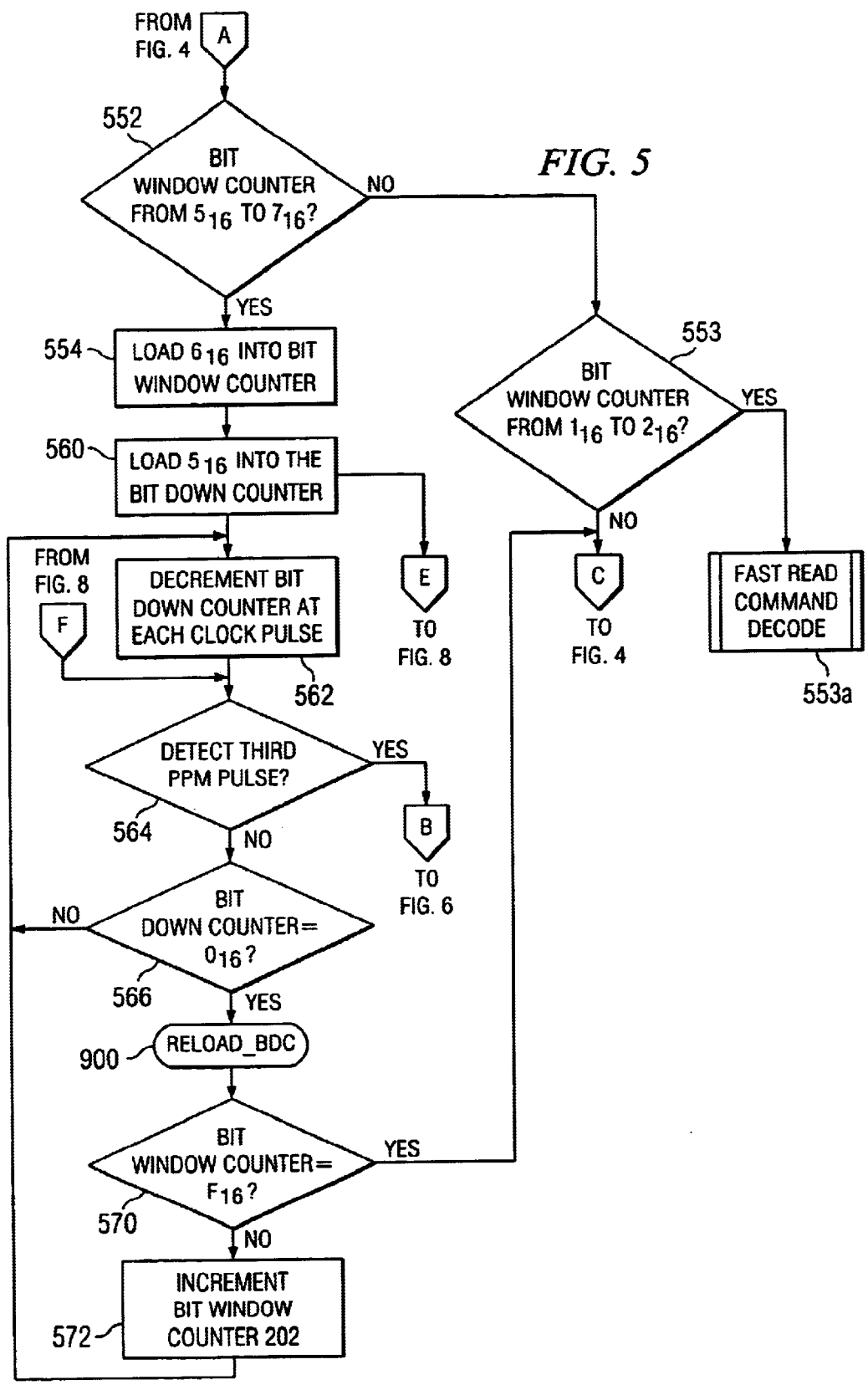
Figure 6:
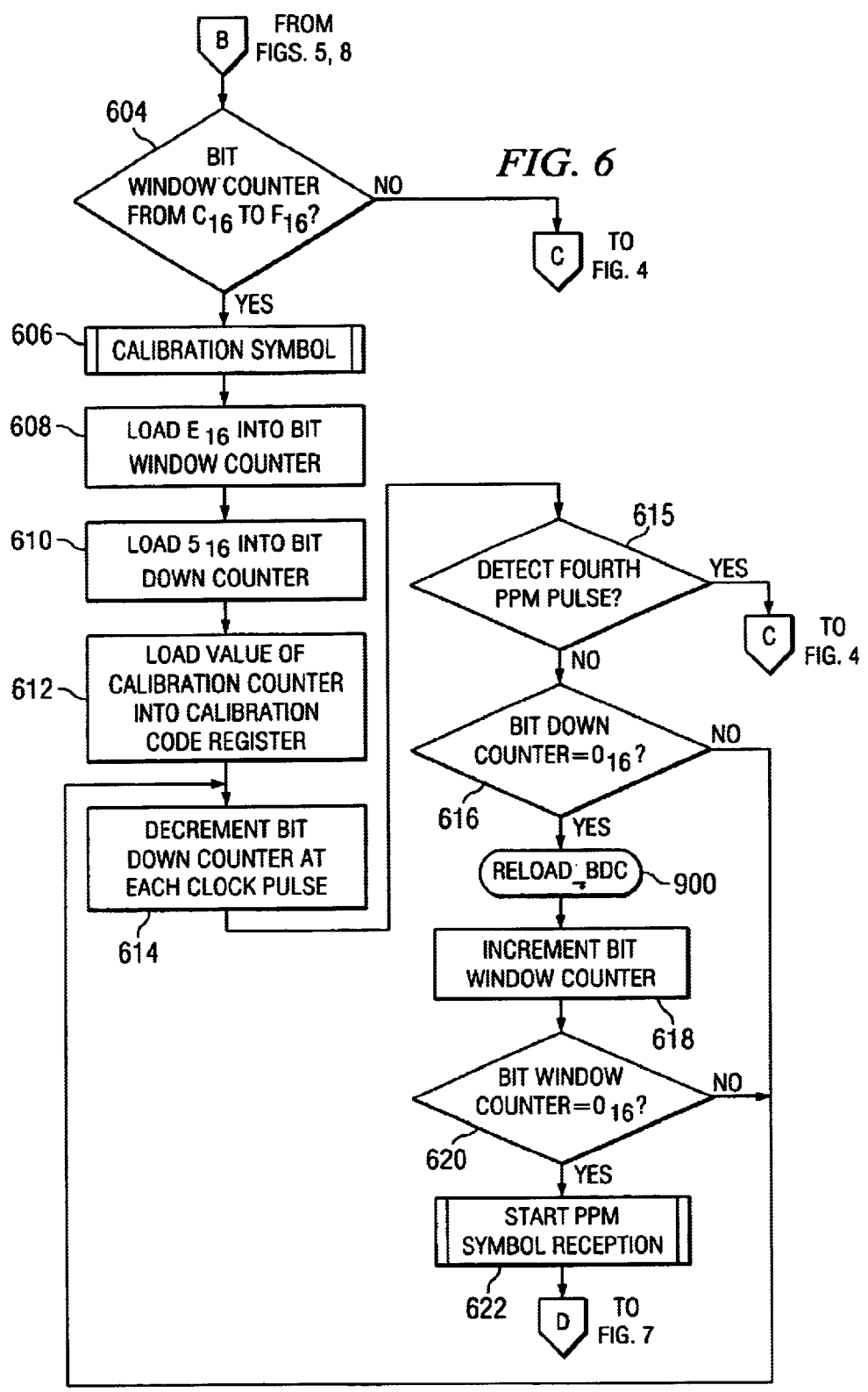

Referring to FIG. 3A, a schematic timing diagram of two consecutive data symbols are illustrated. The first data symbol has a pulse 312 at time slot 0 (symbol "0") and the second data symbol has a pulse 314 at time slot 15 (symbol "$F_{16}$"). First data symbol 0 followed by second data symbol F represent a worst case scenario (maximum time separation between the two symbol pulses) for synchronizing the received PPM symbols and the internal oscillator 112. Pulses 312 and 314 are separated by 31 time slots (1 of 16 PPM). A PPM pulse is recognized on its rising edge as it exceeds a signal detection threshold.

Referring now to FIGS. 4–9, schematic flow diagrams representing the operation of the PPM decoder 116 are illustrated. In step 402, the PPM decoder 116 is initialized, for example during start-up or power-on-reset, by the bit window counter 128 being reset to $0_{16}$ ($0000_b$) in step 404. Step 406 checks for the first PPM pulse 302 and keeps the bit window counter 128 in reset. Once the first PPM pulse 302 has been detected in step 406, the bit down counter 126 is loaded with $5_{16}$ ($0101_b$) in step 408. In step 410, the bit down counter 126 is decremented at each clock pulse of the internal oscillator 112.

Step 411 checks for the second PPM pulse 304, and if there is no PPM pulse 304 then step 412 checks if the bit down counter 126 is at $0_{16}$ ($0000_b$). If the bit down counter 126 is not at $0_{16}$ ($0000_b$) then step 410 continues to decrement the bit down counter 126. If the bit down counter 126 is at $0_{16}$ ($0000_b$) then the steps in subroutine RELOAD_BDC 900 (see FIG. 9) reload the bit down counter 126 with the contents of the reload register 206, and step 414 increments the bit window counter 128. Step 415 checks for overflow of the bit window counter 128, if there is no overflow then step 410 again decrements the bit down counter 126, and if there is overflow then step 404 resets the bit window counter 128 back to $0_{16}$ ($0000_b$)

When step 411 detects the second PPM pulse 304, step 552 checks whether the contents of the bit window counter 128 is from $5_{16}$ ($0101_b$) to $7_{16}$ ($0111_b$). If not, then step 553 checks whether the contents of the bit window counter 128 is from $1_{16}$ ($0001_b$) to $2_{16}$ ($0010_b$). If the contents of the bit window counter 128 is from $1_{16}$ ($0001_b$) to $2_{16}$ ($0010_b$) then step 553a determines that a fast read command decode be used. If the contents of the bit window counter 128 is not from $1_{16}$ ($0001_b$) to $2_{16}$ ($0010_b$) then step 404 resets the bit window counter 128 to $0_{16}$ ($0000_b$). When step 552 determines that the contents of the bit window counter 128 is from $5_{16}$ ($0101_b$) to $7_{16}$ ($0111_b$), then step 554 loads $6_{16}$ ($0110_b$) into the bit window counter 128, and step 560 loads $5_{16}$ ($0101_b$) into the bit down counter 126.

Step 562 decrements the bit down counter 126 at each clock pulse of the internal oscillator 112. Step 564 checks for a third PPM pulse 306, and if the third PPM pulse 306 is detected then step 604 checks whether the contents of the bit window counter 128 is from $C_{16}$ ($1100_b$) to $F_{16}$ ($1111_b$), if not then step 404 resets the bit window counter 128 back to $0_{16}$ ($0000_b$) as described above.

If the third PPM pulse 306 is not detected in step 564 then step 566 checks if the contents of the bit down counter 126 is $0_{16}$ ($0000_b$). If no then step 562 resumes decrementing the bit down counter 126, and if yes then the steps in subroutine RELOAD_BDC 900 (see FIG. 9) reload the bit down counter 126 with the contents of the reload register 206. Step 570 then checks whether the contents of the bit window counter 128 is $F_{16}$ ($1111_b$), if no then step 572 increments the bit window counter 128 and step 562 decrements the bit down counter 126 as described above. When step 570 determines that the contents of the bit window counter 128 is $F_{16}$ ($1111_b$), then step 404 resets the bit window counter 128 to $0_{16}$ ($0000_b$) as described above.

Figure 8:
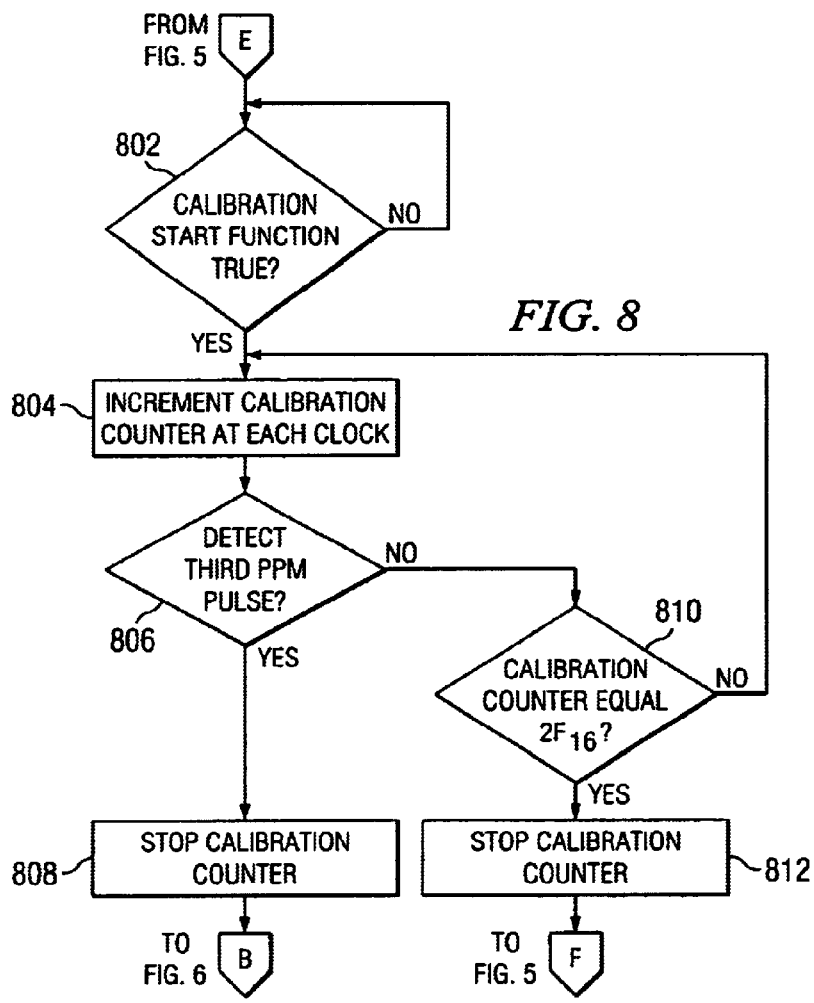

Referring now to FIG. 8, Step 802 determines whether a calibration start function is true (see table 2 of FIG. 11). When the calibration start function is true, step 804 increments the calibration counter 212 at each clock pulse of the internal oscillator 112. Step 806 determines when the third PPM pulse 306 is detected. If the third PPM pulse 306 is not detected then step 810 determines if the calibration counter 212 is equal to $2F_{16}$ ($0010\ 1111_b$), and if not, then step 804 increments the calibration counter 212. When step 810 determines that the calibration counter 212 is equal to $2F_{16}$ ($0010\ 1111_b$) then step 812 stops the calibration counter 212 and returns operation back to step 564 (see FIG. 5). When step 806 detects the third PPM pulse 306, then step 808 stops the calibration counter 212 and returns operation back to step 604.

When step 604 determines that the contents of the bit window counter 128 is from $C_{16}$ ($1100_b$) to $F_{16}$ ($1111_b$), then a PPM code violating calibration symbol 300 is recognized in step 606. Then step 608 loads $E_{16}$ ($1110_b$) into the bit window counter 128, step 610 loads $5_{16}$ ($0101_b$) into the bit down counter 126, and step 612 loads the value of the calibration counter 212 into the calibration code register 208. Step 614 decrements the bit down counter at each clock pulse of the internal oscillator 112.

Step 615 checks for another PPM pulse, and if a PPM pulse is detected then step 404 resets the bit window counter 128 back to $0_{16}$ ($0000_b$) If a PPM pulse is not detected in step 615 then step 616 determines whether the contents of the bit down counter 126 is $0_{16}$ ($0000_b$) If no, then step 614 decrements the bit down counter at each clock pulse of the internal oscillator 112. If yes, then the steps in subroutine RELOAD_BDC 900 (see FIG. 9) reload the bit down counter 126 with the contents of the reload register 206. Step 618 increments the bit window counter 128 and then step 620 checks whether the contents of the bit window counter 128 is $0_{16}$ ($0000_b$). If no then step 614 decrements the bit down counter 126 at each clock pulse of the internal oscillator 112, and step 616 determines whether the contents of the bit down counter is $0_{16}$ ($0000_b$) as described above.

Figure 7:
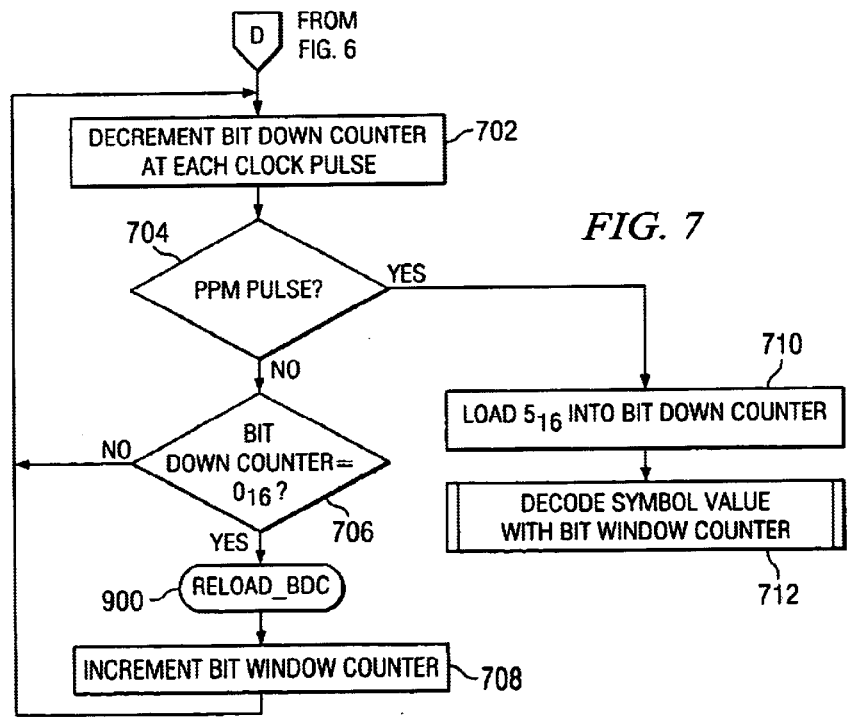
FIGS. 4–9 are schematic flow diagrams representing the operation of the calibration/reload function illustrated in FIG. 2.

When step 620 determines that the contents of the bit window counter 128 is $0_{16}$ ($0000_b$) then step 622 starts PPM symbol reception. Referring now to FIG. 7, step 702 decrements the bit down counter 126 at each clock pulse of the internal oscillator 112. Step 704 checks for a PPM pulse, if a PPM pulse is detected then step 710 loads $5_{16}$ ($01001_b$) into the bit down counter 126 and step 712 decodes the 1 of 16 PPM symbol value with the bit window counter 128.

If no PPM pulse is detected in step 704 then step 706 determines whether the contents of the bit down counter is $0_{16}$ ($0000_b$). If no, step 702 decrements the bit down counter 126 at each clock pulse of the internal oscillator 112 as described above. If yes, then the steps in subroutine RELOAD_BDC 900 (see FIG. 9) reload the bit down counter 126 with the contents of the reload register 206. Then step 708 increments the bit window counter 128 and step 702 decrements the bit down counter 126 at each clock pulse of the internal oscillator 112, as led described above.

Referring back to FIG. 2, if the current calibration code is correct, then the reception to the $3^{rd}$ bit of the calibration symbol (modulation pulse 306) will occur when the values in the bit window counter 128 equals $E_{16}$ and the bit down counter 126 equals $5_{16}$, respectively. Under these conditions the value in the calibration counter 212 will always equal the value in the calibration code register 208. The difference between the old value of the calibration code register 208 and a new value represents the accumulated error in clock cycles over 8 bits times. For example, if the difference between the old value and the new value of the calibration code register 208 is one then the accumulated calibration error is one count in 8 bit periods or $\frac{1}{8}^{th}$ of a clock per bit period.

This example represents the precision of this embodiment of the present invention. The level of precision that is preferred in this embodiment is determined by the worst case transmission, illustrated in FIG. 3A, which is the symbol $0_{16}$ followed by the symbol $F_{16}$ The spacing between a symbol $0_{16}$ and a symbol $F_{16}$ is 31 bit periods. Therefore the worst case accumulated error at the given precision would be plus or minus $3\frac{1}{8}^{ths}$ or approximately 4 for a total window error of less than 8. For a successful transmission the worst case error is less than the number of counts in the bit period. However, it is not possible to produce $\frac{1}{8}^{th}$ of a count on every bit period without using an oscillator running at 8×of the count speed. Since this would be undesirable in terms of power consumption, the fractional window values are implemented as an average over the entire symbol time. This is implemented by incrementing the value in the reload register 206 by one, N out of 8 times (represented by the numeral 214), where N is the value in the lower 3 bits of the calibration code register 208.

Figure 9:
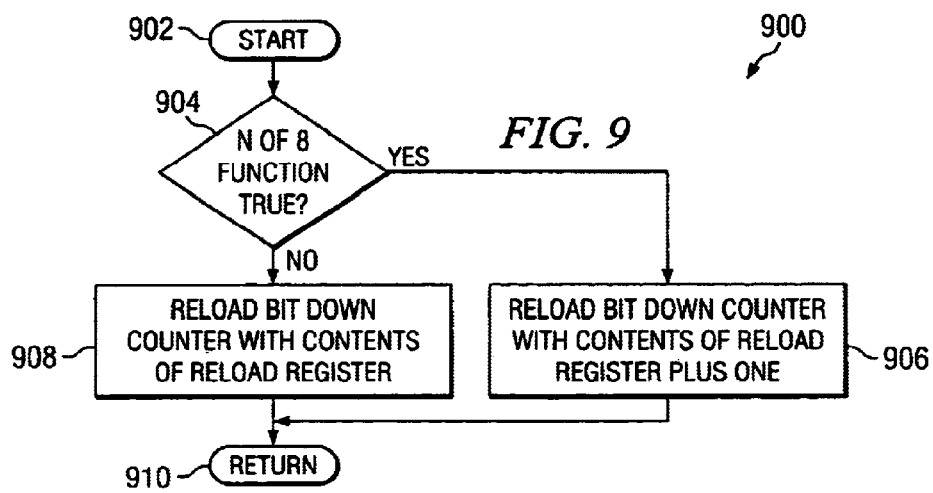

Referring to FIG. 9, subroutine RELOAD_BDC is generally indicated by the numeral 900. When the subroutine RELOAD_BDC 900 is called from the steps above, step 902 starts this subroutine and step 904 determines whether the N of 8 function is true. Table 1 of FIG. 10 contains the truth table of step 904, according to an embodiment of the invention. When step 904 determines that the N of 8 function is, true (FIG. 10) then step 906 reloads the bit down counter 126 with the contents of the reload register 206 plus one (see also FIG. 2). When the N of 8 function is not true (FIG. 10) then step 908 reloads the bit down counter 126 with only the contents of the reload register 206. The step 910 returns back to the aforementioned steps from the steps of subroutine RELOAD_BDC 900.

Referring now to FIG. 11, the values of the bit window counter 128 ($BWC_{16}$) and the bit down counter 126 ($BDC_{16}$) for which the calibration start function evaluates true for a given current calibration code is illustrated in Table 2.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A pulse position modulation (PPM) decoder, comprising:
   a synchronizer;
   a PPM decoder state machine
   a calibration/reload function
   a bit down counter;
   a bit window counter; and
   a symbol register having a data symbol output,
   wherein:
      the synchronizer has a first input adapted to receive a detected PPM signal, a second input connected to an internal oscillator, and an output connected to a first input of the PPM decoder state machine and a first input of the symbol register;
      the PPM decoder state machine has a second input connected to the internal oscillator, a first output connected to a first input of the calibration/reload function, a second output connected to a second input of the bit down counter and a third output connected to a second input of the bit window counter;
      the calibration/reload function has a second input connected to the internal oscillator and an output connected to a first input of the bit down counter;
      the bit down counter has a third input connected to the internal oscillator and an output connected to a first input of the bit window counter;
      the bit window counter has a third input connected to the internal oscillator, a first output connected to a second input of the symbol register, and a second output connected to a third input of the PPM decoder state machine; and
      the symbol register has an output comprising symbol data.

2. The PPM decoder of claim 1, wherein the calibration/reload function comprises:
   a calibration counter controller;
   a calibration counter;
   a calibration code register;
   a reload register;
   an N of 8 function;
   an increment by 1 function;
   a load fixed value function; and
   a circuit for switching between the increment by 1 function and the load fixed value function,
   wherein:
      the calibration counter controller has a first input connected to the output of the PPM decoder state machine, a second input connected to the output of the bit down counter, a third input connected to the output of the bit window counter, a fourth input connected to a first output of the calibration code register, and an output connected to an input of the calibration counter;
      the calibration counter has an output connected to an input of the calibration code register;
      the calibration code register has a second output connected to a first input of the N of 8 function and an input of the reload register;
      the N of 8 function has a second input connected to the first output of the bit window counter and an output connected to a first input of the increment by 1 function;
      the reload register has an output connected to a second input of the increment by 1 function; and
      the switching circuit has a first input connected to an output of the increment by 1 function, a second input connected to an output of the load fixed value function, and an output connected to the first input of the bit down counter.

3. The PPM decoder of claim 1, wherein the switching circuit is a multiplexer.

4. A method of calibrating a pulse position modulation (PPM) decoder to a PPM signal, said method comprising the steps of:
   a) loading $0_{16}$ ($0000_b$) in a bit window counter;
   b) loading $5_{16}$ ($0101_b$) in a bit down counter when a first PPM pulse is detected;
   c) decrementing the bit down counter on each clock pulse;
   d) determining when a second PPM pulse is detected, wherein
      if the second PPM pulse is detected then going to step l), and if the second PPM pulse is not detected then going to step e);

e) determining when the bit down counter is equal to $0_{16}$ ($0000_b$), wherein
   if the bit down counter is not equal to $0_{16}$ ($0000_b$) then returning to step c), and
   if the bit down counter is equal to $0_{16}$ ($0000_b$) then going to step f);

f) reloading the bit down counter;

g) incrementing the bit window counter;

h) determining if the bit window counter has overflowed, wherein
   if the bit window counter has overflowed then returning to step a), and
   if no overflow, then returning to step c);

i) determining if the bit window counter is from $5_{16}$ ($0101_b$) to $7_{16}$ ($0111_b$), wherein
   if the bit window counter is not from $5_{16}$ ($0101_b$) to $7_{16}$ ($0111_b$) then determining if the bit window counter is from $1_{16}$ ($0001_b$) to $2_{16}$ ($0010_b$), wherein
      if the bit window counter is from $1_{16}$ ($0001_b$) to $2_{16}$ ($0010_b$)
      then executing a fast read command decode, and
      if not then returning to step a),
   if the bit window counter is from $5_{16}$ ($0101_b$) to $7_{16}$ ($0111_b$) then continuing to step j);

j) loading $6_{16}$ ($0110_b$) into the bit window counter;

k) loading $5_{16}$ ($0101_b$) into the bit down counter;

l) determining when a calibration start function is true, then
   $l_1$) incrementing a calibration counter on each clock pulse,
   $l_2$) determining if a third PPM pulse is detected, wherein
      if the third PPM pulse is detected then stopping the calibration counter and going to step t), and
      if not detected then going to step m)

m) determining if the calibration counter is equal to $2F_{16}$ (0010 1111b), wherein
   if the calibration counter is not equal to $2F_{16}$ (0010 1111b) then
   going to step $l_1$), and
   if equal then stopping the calibration counter and going to step o);

n) decrementing the bit down counter on each clock pulse;

o) determining if the third PPM pulse is detected, wherein
   if the third PPM pulse is detected then going to step t), and
   if not detected then going to step $p_1$);

$p_1$) determining if the bit down counter is equal to $0_{16}$ ($0000_b$), wherein
   if the bit down counter is not equal to $0_{16}$ ($0000_b$) then returning to
   step n), and
   if equal to $0_{16}$ ($0000_b$), then going to step q);

$p_2$) reloading the bit down counter;

q) determining if the bit window counter is equal to $F_{16}$ ($1111_b$), wherein
   if the bit window counter is equal to $F_{16}$ ($1111_b$) then returning to step a), and
   if not equal then going to step s);

r) incrementing the bit window counter then returning to step n);

s) determining if the bit window counter is from $C_{16}$ ($1100_b$) to $F_{16}$ ($1111_b$), wherein if the bit window counter is not from $C_{16}$ ($1100_b$) to $F_{16}$ ($1111_b$) then going to step a), and
   if the bit window counter is from $C_{16}$ ($1100_b$) to $F_{16}$ ($1111_b$) then going to step u);

t) recognizing a PPM code violating calibration symbol;

u) loading $E_{16}$ ($1110_b$) into the bit window counter;

v) loading $5_{16}$ ($0101_b$) into the bit down counter;

w) loading a value in the calibration counter into the calibration code register;

x) decrementing the bit down counter on each clock pulse;

y) determining when a fourth PPM pulse is detected, wherein
   if the fourth PPM pulse is detected then returning to step a), and
   if the fourth PPM pulse is not detected then going to step aa);

z) determining when the bit down counter is equal to $0_{16}$ ($0000_b$), wherein
   if the bit down counter is not equal to $0_{16}$ ($0000_b$) then returning to
   step y), and
   if equal to $0_{16}$ ($0000_b$) then going to step bb);

aa) reloading the bit down counter;

bb) incrementing the bit window counter;

cc) determining when the bit window counter is equal to $0_{16}$ ($0000_b$), wherein
   if the bit window counter is not equal to $0_{16}$ ($0000_b$) then returning to step y), and
   if equal to $0_{16}$ ($0000_b$) then going to step ee);

dd) starting PPM symbol reception;

ee) decrementing the bit down counter on each clock pulse;

ff) determining when another PPM pulse is detected, wherein
   if the another PPM pulse is detected then going to step kk); and
   if the another PPM pulse is not detected then going to step hh);

gg) determining when the bit down counter is equal to $0_{16}$ ($0000_b$), wherein
   if the bit down counter is not equal to $0_{16}$ ($0000_b$) then returning to step ff), and
   if equal to $0_{16}$ ($0000_b$) then going to step ii);

hh) reloading the bit down counter;

ii) incrementing the bit window counter then returning to step ff);

jj) loading $5_{16}$ ($0101_b$) into the bit down counter; and kk) decoding a symbol value with the bit window counter.

5. The method of claim 4, when the step of reloading the down counter comprises the steps of:
   determining when an N of 8 function is true, wherein
      if the N of 8 function is true then reloading the bit down counter with the contents of the reload register plus one, and
      if not true then reloading the bit down counter with the contents of the reload register.

6. The method of claim 5, wherein the N of 8 function is true when the contents of the bit window counter and the lower 3 bits of a calibration code are selected from the group consisting of (bit window counter, calibration code) (0, 3), (0, 6), (0, 7), (1, 3), (1, 4), (1, 6), (1, 7), (2, 3), (2, 6), (2, 7), (3, 2), (3, 4), (3, 5), (3, 7), (4, 5), (4, 6), (4, 7), (5, 4), (5, 5), (5, 6), (5, 7), (6, 5), (6, 6), (6, 7), (7, 1), (7, 2), (7, 4), (7, 5), (8, 3), (8, 6), (8, 7), (9, 3), (9, 4), (9, 6), (9, 7), (10, 3), (10, 5), (10, 6), (10, 7), (11, 2), (11, 4), (11, 5), (11, 2), (11, 4), (11, 5), (11, 2), (11, 4), (11, 5), (11, 2), (11, 4), (11, 5), (11, 7), (12, 5), (12, 6), (12, 7), (13, 4), (13, 5),(13, 6), (13, 7), (14, 5), (14, 6), (14, 7), (15, 1), (15, 2), (15, 4) and (15, 5).

7. A radio frequency identification (RFID) tag system having a pulse position modulation (PPM) decoder which calibrates to a received PPM signal, said RFID tag system comprising:

a PPM modulation detector;

an internal oscillator;

a PPM decoder having inputs connected to the PPM modulation detector and the internal oscillator, and an output having symbol data, wherein the PPM decoder is adapted for receiving a detected PPM signal from the PPM modulation detector and clock timing from the internal oscillator, said PPM decoder comprising:

a synchronizer;

a PPM decoder state machine a calibration/reload function a bit down counter;

a bit window counter; and a symbol register having a data symbol output, wherein:

the synchronizer has a first input adapted to receive the detected PPM signal, a second input connected to the internal oscillator, and an output connected to a first input of the PPM decoder state machine and a first input of the symbol register;

the PPM decoder state machine has a second input connected to the internal oscillator and a first output connected to a first input of the calibration/reload function, a second output connected to a second input of the bit down counter and a third output connected to a second input of the bit window counter;

the calibration/reload function has a second input connected to the internal oscillator and an output connected to a first input of the bit down counter;

the bit down counter has a third input connected to the internal oscillator and an output connected to a first input of the bit window counter;

the bit window counter has a third input connected to the internal oscillator, a first output connected to a second input of the symbol register, and a second output connected to a third input of the PPM decoder state machine; and the symbol register has an output comprising the symbol data.

8. The RFID tag system of claim 7, wherein the calibration/reload function comprises:

a calibration counter controller;

a calibration counter;

a calibration code register;

a reload register;

an N of 8 function;

an increment by 1 function;

a load fixed value function; and a circuit for switching between the increment by 1 function and the load fixed value function, wherein:

the calibration counter controller has a first input connected to the output of the PPM decoder state machine, a second input connected to the output of the bit down counter, a third input connected to the output of the bit window counter, a fourth input connected to a first output of the calibration code register, and an output connected to an input of the calibration counter;

the calibration counter has an output connected to an input of the calibration code register;

a the calibration code register has a second output connected to a first input of the N of 8 function and an input of the reload register;

the N of 8 function has a second input connected to the first output of the bit window counter and an output connected to a first input of the increment by 1 function;

the reload register has an output connected to a second input of the increment by 1 function; and the switching circuit has a first input connected to an output of the increment by 1 function, a second input connected to an output of the load fixed value function, and an output connected to the first input of the bit down counter.

9. The RFID tag system of claim 7, wherein the switching circuit is a multiplexer.

10. The RFID tag system of claim 7, wherein said RFID tag system is fabricated on an integrated circuit die.

11. The RFID tag system of claim 10, wherein the integrated circuit die is packaged in an integrated circuit package.

* * * * *